Nov. 23, 1965

D. D. BROWN, JR., ETAL  3,219,107

REMOTE AND AUTOMATIC CONTROL OF PETROLEUM PRODUCTION

Filed Sept. 14, 1960  6 Sheets-Sheet 1

# United States Patent Office 3,219,107
Patented Nov. 23, 1965

3,219,107
REMOTE AND AUTOMATIC CONTROL OF
PETROLEUM PRODUCTION
Delma D. Brown, Jr., and George J. Dorris, Jr., Dallas, Tex., assignors to Socony Mobil Oil Company, Inc., a corporation of New York
Filed Sept. 14, 1960, Ser. No. 56,002
21 Claims. (Cl. 166—8)

This invention relates to automatic production of hydrocarbon liquids and gas from a plurality of high pressure wells. In a more specific aspect the invention relates to a control system and a flow system which are interrelated for assuring safety of operation while maintaining production efficiency.

In producing oil and gas wells in the tidelands and other marine areas it has been customary to drill several wells from a single location or platform and to control the direction of drilling so that the wells may be completed at radially located points and in producing formations of different depths. Such producing platforms generally are remotely located from one another as well as from central gathering and treating stations so that it becomes necessary to meter the production of each producing well and then commingle production from all wells on a given producing platform for flow to a central treating station. Further, it has been found desirable to reduce to a minimum the manual operations necessary in the conduct of the producing operation of such a production unit. Prior art systems have involved remotely controlled producing operations. The presence of high pressure producing wells at a marine platform may present operational problems and a hazard to personnel and to property in the absence of supervisory and precautionary measures which will automatically take over operations upon occurrence of other than normal process conditions or variables. Furthermore, the provision of control facilities at a central gathering and treating station remote from the producing location requires unique measures as to measurement, alarm and control.

It is an object of the present invention to provide an automatic producing system which will permit production of hydrocarbons from high pressure sources at a location remote from a control station while at the same time incorporating safety features and a production control system responsive to a remote control station for operation of a producing facility unattended at the actual producing location.

In accordance with the present invention there is provided a method and system for producing gas and entrained liquids from a plurality of high pressure wells, the heads thereof being located at a common producing location. The total flow and the flowing pressure from each of the wells are separately sensed. Flow from all wells is then commingled, and in a treating zone, maintained at pressure substantially lower than the flowing pressure of the wells, hydrocarbon liquids and water entrained in said gas are separated. The quantities of gas, hydrocarbon liquids and water are then separately sensed, following which the gas and hydrocarbon liquids are transmitted to a central treating station. Flow from all of the wells is maintained under control of the gas pressure. In response to flowing pressure from any well below a predetermined minimum the well is adapted to be closed under control of said gas pressure. In response to occurrence in the treating zone of any one of high liquid level or pressure in excess of a predetermined maximum or less than a predetermined minimum, all of the wells simultaneously are closed in response to the gas pressure. Following closure of all wells, the treating zone is vented to atmospheric pressure.

In a more specific aspect there is provided a producing system for a plurality of high pressure wells, the products from which are commingled, the total flow therefrom being separated into gas, liquid hydrocarbon components in a treating system, and separately metered, for transmission to a control station remote therefrom. There is provided a combination which comprises a first system including means individually responsive to conditions in each of said wells for individually controlling said wells. A second system including means responsive to a first set of conditions in the treating system is provided for actuating the first system simultaneously to control all of said wells. A third system is then provided responsive to a different set of conditions in said treating system for actuating the first system simultaneously to close all of said wells. In a further aspect of the invention either said first system or second system is adapted to be actuated in response to a control action at said control station.

In accordance with a further aspect of the invention, each of a plurality of gas wells at a producing location is provided with a flow controller and a flow line leading therefrom to a common header system. A check valve and a pressure responsive device are located between said header system and each of said flow controllers. A treating system is provided including a line heater, a liquid-gas separator which is adapted to operate with liquid level and pressure therein within predetermined level and pressure ranges respectively. A dehydration unit connected to the gas outlet of said separator is provided for eliminating water from the separated gas. Gauging means is provided separately to measure gas, liquid hydrocarbons and water issuing from said separator. Flow channels leading from the metering means extend to a common flow line for commingling gas and liquid hydrocarbons for flow from the producing location. A gas powered control system is connected to the output of the dehydration unit and extends to each of the flow controllers. An electrical generator system is provided for a first control circuit which is adapted normally to control application of said power gas to each said flow controller to maintain all of said wells open. Linkages between said circuit and the pressure responsive devices in said flow lines are provided for closing a given one of said wells upon the occurrence of low pressure in its flow line. A second control circuit is provided which is operative independently of said first control circuit and is adapted to override the same simultaneously to apply said power gas for closure of all of the wells upon the occurrence of liquid level or pressures in said separator outside preset ranges. Means are provided for transmitting to a location remote from the producing location indications of process variables at said producing location including well flow rates and pressures, and treating level, temperature and pressures. Means are then provided in the second control circuit in response to an energizing action transmitted from the remote location to control any one of the wells or simultaneously to close all of the wells.

For further objects and advantages of the present invention and for a more complete understanding thereof, reference may now be had to the following description taken in conjunction with the accompanying drawings in which.

Figure 5:
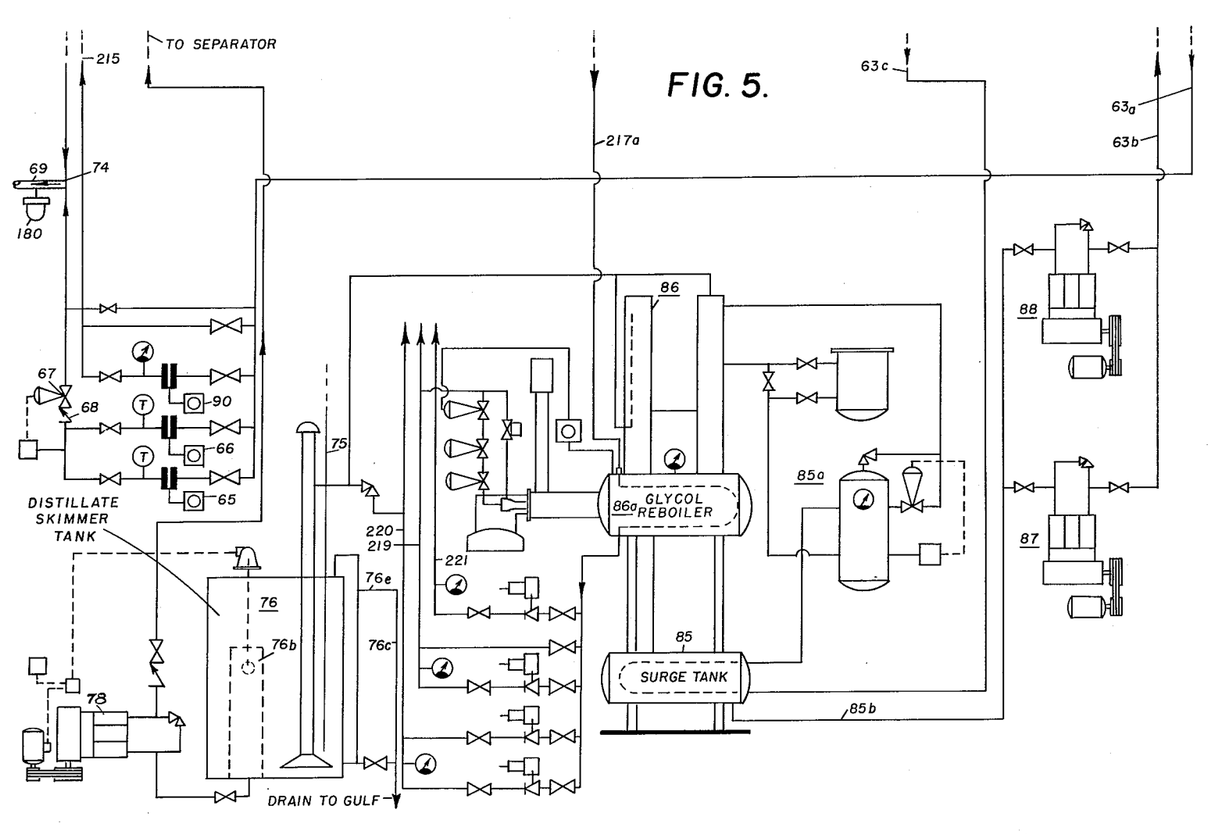
Figure 6:
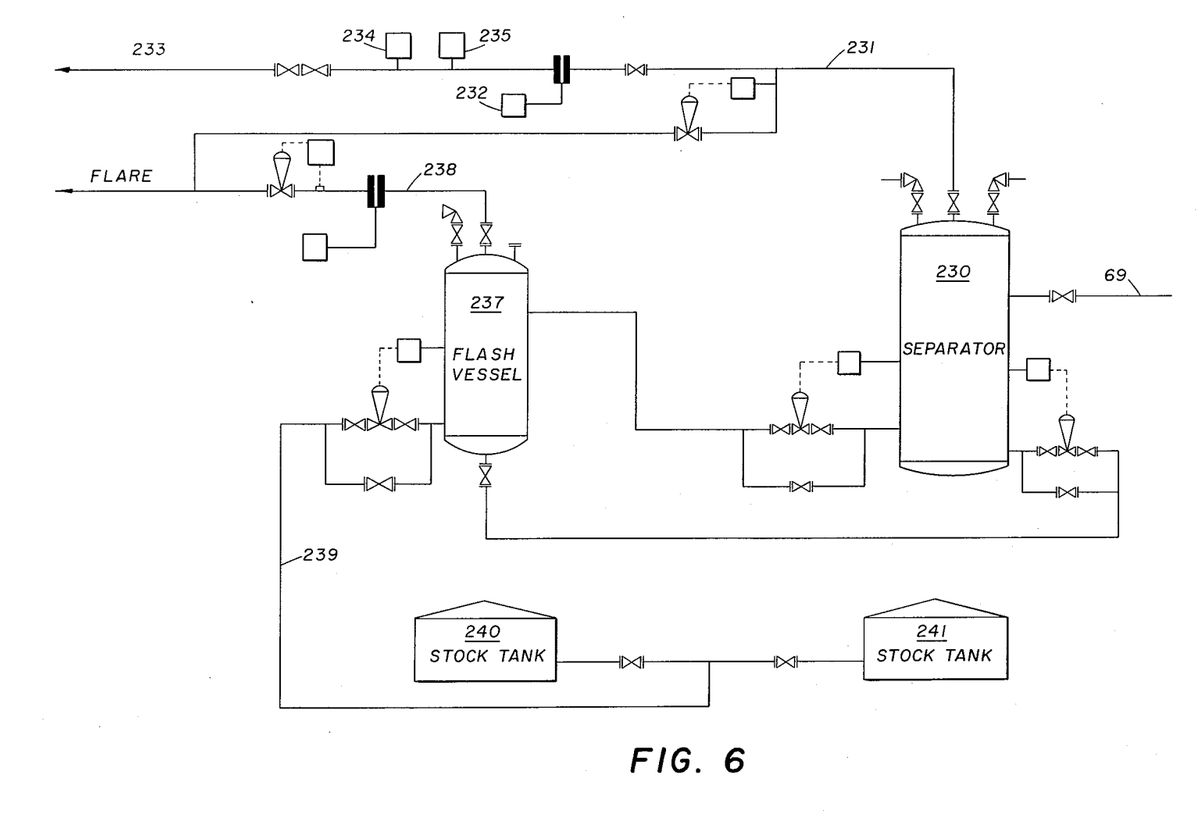
FIG. 6 is a flow diagram of a central gathering and treating station.

In accordance with the persent invention, a control system which selectively is either automatically or manually operable is provided for control of a plurality of producing wells. The arrangement is such that manual operation can be initiated either remotely or at the well site. In one embodiment of this invention seven wells completed from a producing platform were provided with the necessary apparatus to carry out with safety all necessary and authorized producing operations. The seven wells were of high pressure and were producing principally gas with some entrained hydrocarbon liquids and some water. The application of the invention to such a system will be described first in connection with a simplified flow and control chart of FIG. 1. There will then be described the remote controls and alarms operative in the system of FIG. 1 through the instrumentality of a supervisory control system terminating at an onshore control station remote from the producing site, the control station being represented by the diagram of FIG. 2. There will then be described in more detail the producing equipment as in FIGS. 3–5, all representing equipment located at the well site and the system of FIG. 6 representing the gathering and treating portions of the systems located at the onshore station.

Figure 1:
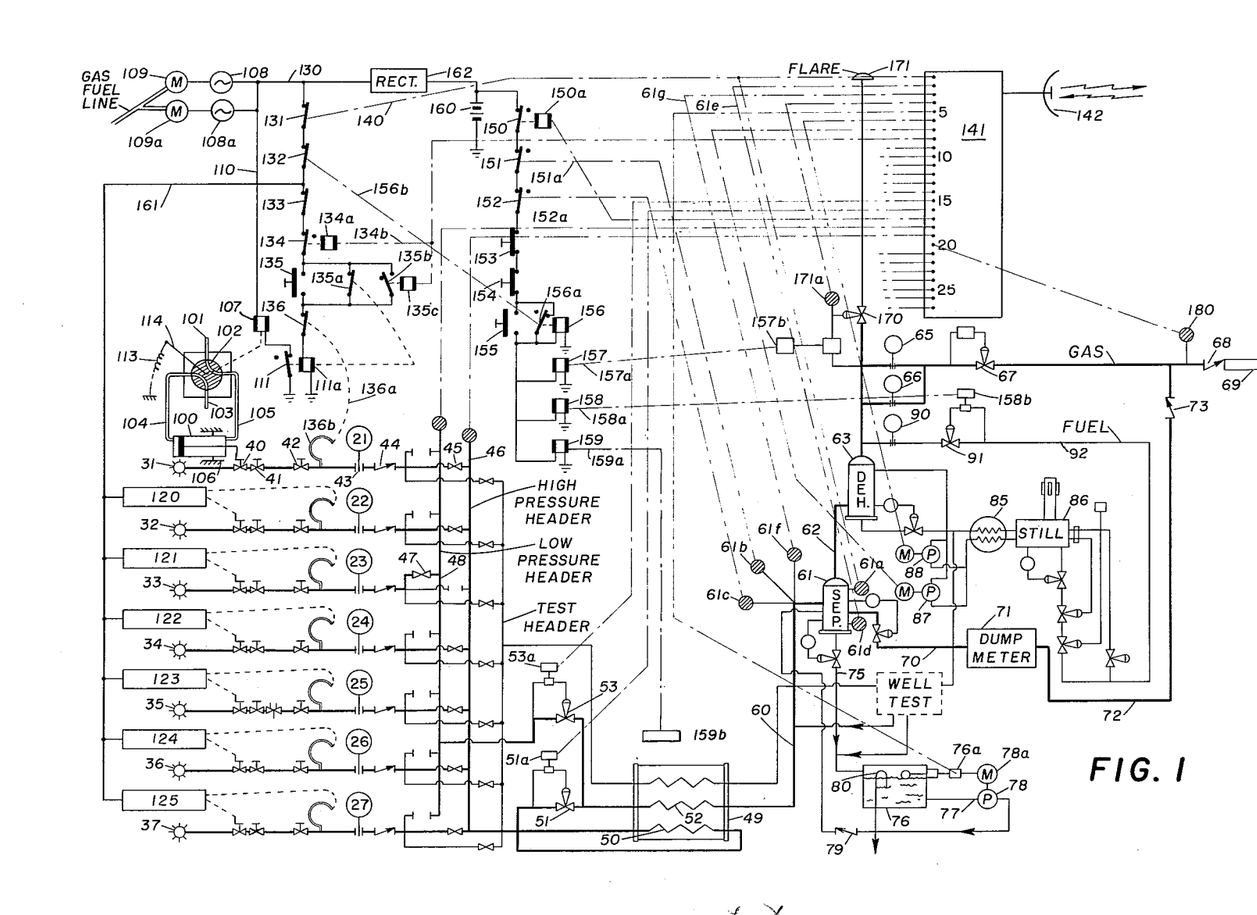
FIG. 1 schematically illustrates a flow and control system.

Referring now to FIG. 1, seven wells 31–37 were all drilled from the same platform with drilling so controlled that the wells were completed at different depths and at locations spaced laterally from the well head. In the system illustrated, wells 31, 32 and 34–37 are relatively high pressure wells, the pressures being of the order of from about 3000 p.s.i.a. to about 7000 p.s.i.a. Well 33, completed in a different strata, was of relatively low pressure, being of the order of about 2000 p.s.i.a. The wells were completed in different formations and on different leases and thus required the separate measurement of production from each well.

The flow systems for each of the wells 31–37 are similar. Well 31, for example, is connected by way of a pneumatically operated valve 40, a manually operated valve 41, and a choke 42 to an orifice type, full-stream metering unit 43. Products then flow by way of a check valve 44 and a valve 45 to a high pressure header 46. In a similar manner wells 32 and 34–37 are connected to the high pressure header 46.

Well 33 is similarly equipped but is connected by way of valve 47 to the low pressure header 48. The combined products from wells 31, 32 and 34–37 flow from the high pressure header 46 through a processing system for separation of the constituents and for dehydration of the gas component. The processing system includes a line heater 49 and more particularly a first set of coils 50 in heater 49. The output of coil 50 flows by way of a remotely controlled adjustable choke 51 to a second heater coil 52. Products from well 33 flow by way of remotely controlled adjustable choke 53 to the heater coil 52, the flow from both the high pressure header and the low pressure header being commingled at the input of coil 52. From heater 49 the commingled flow passes through line 60 to a production separator 61. Gas from production separator 61 then passes by way of line 62 to a dehydrator 63 and then by way of a dual meter run including meters 65 and 66, valve 67 and check valve 68 to a transmission line 69 leading from the producing platform to an onshore gathering and treating station.

Distillate from separator 61 flows by way of line 70 to a meter 71 and then by way of line 72 and check valve 73 for commingled flow with the gas in the transmission line 69. Water from separator 61 flows by way of line 75 to a skimmer tank 76 which serves to skim off any distillate carried by water into the tank 76. The skimmer tank is provided with a distillate output flow line 77 which is connected to separator 61, by way of high pressure pump 78 and check valve 79 for reinjection of the distillate thus salvaged into the separator. Water collected in the skimmer tank 76 is dumped from a platform by way of a drain 80.

The dehydrator 63 is of the glycol contactor type through which gas from the production separator flows. Water vapor in the gas is absorbed by lean glycol causing the glycol to become enriched. The enriched glycol is circulated through a heat exchanger 85 and then to a glycol dehydration reconcentrator unit 86, a still, which strips water out of the glycol. The lean glycol then passes back through the heat exchanger 85 and is recirculated by means of pump 87 or 88 or both.

Fuel gas is derived from the output of the dehydrator 63 and flows through a recording meter 90 and back pressure check valve 91 to a fuel distribution system 92. In the diagram of FIG. 1 the fuel line extends to the fuel input of the still 86. The fuel line also is connected by lines (not shown) to the line heater 49. Gas from the line 92 is also supplied for control and instrumentation purposes and will hereinafter be referred to as power gas.

In the operation of wells such as illustrated in FIG. 1 where complete automation is to be carried out it is necessary that suitable safety and control functions be incorporated in the system to accommodate any contingency that may arise. In the present case each of the seven gas wells is provided with a surface fitting or Christmas tree. An electropneumatic-operated plug valve is bolted between the tree's wing valve and a positive flow choke. More particularly, the electropneumatically operated plug valve 40 is so designed that it can be manually operated with a valve wrench. However, it is also provided with a power cylinder operator 100 which is connected to the plug of valve 40 by a lever arm arrangement such that when power gas from a power gas line 101 enters the power cylinder 100, the plug valve will rotate to a closed or shut in position. The flow of power gas from power gas line 101 is controlled by a four-way valve 102. Valve 102 is provided with a vent line 103 and lines 104 and 105. In the position shown the valve 102 serves to apply power gas to the line 105 forcing the piston in the power cylinder 100 to the *open* position. The piston is connected to a lever arm on the valve 40. The power cylinder 100 is pivoted as indicated by the pivots 106 so that the power cylinder may rotate to accommodate rotation of the lever arm on valve 40. By means of a solenoid 107, the four-way control valve 102 is normally positioned as to maintain valve 40 open. Solenoid 107 is energized from an alternating current generator 108 which is driven by a gas powered engine 109 supplied by a supply line (not shown) leading from the system of separator 61. A conductor 110 leads from generator 108 to one terminal of relay coil 107. The second terminal is connected by way of switch 111 to a return circuit represented by the ground connection. So long as the switch 111 is in its closed position, relay 107 will be energized to position the four-way valve to maintain valve 40 *open*. Valve 102 is spring-loaded as diagrammatically represented by the spring 113 coupled to an arm 114 so that when switch 111 opens to deenergize relay 107, the spring 113 will rotate the valve 102 such that power gas is supplied by way of line 104 to the operator 100 to *close* valve 40. At the same time, line 105 is vented to atmosphere. Thus each well may selectively be opened or closed, each being provided with a power cylinder operator such as operator 100. Such valve operation comprises one of the control functions to be carried out: (1) automatically in response to conditions on the producing platform which would be hazardous; (2) selectively from a remote station; or (3) manually by personnel at the producing location if it is desired.

It will be noted that each of the remaining wells 32–37 is provided with control systems though the latter have been illustrated in block form only. The blocks 120–125 represent control systems as above described but which serve to control flow from wells 32–37, respectively.

In addition to the provision of an electropneumatic-operated plug valve at each well head there is provided for each well a positive flow choke such as choke 42. Choke 42 leading from well 31 is sized such that only a minimum pressure drop occurs. The choke is not for control purposes but rather is a safety device in the event the well is not shut in by a bottom hole choke or by the electropneumatic valve operator 100 upon rupture of the flow line between choke 42 and the treating system. The choke will serve only to hold a back pressure on the well and to restrict the flow to critical flow conditions on such failure. However, a choke such as choke 42 in each of the lines leading from wells in this system which have extremely high shut in pressure are sized so that the pressure is reduced to approximately 3000 p.s.i.a. or such other working pressure of the system to which they are connected.

In automatic and remote controlled operations, a primary focus is upon provisions for the closure of the producing wells either for control or supervisory purposes or in an emergency. For this purpose a pair of control systems are employed which may be operated independently of one another and which are so designed as to provide a fail-safe operation. The first of the systems involves a plurality of groups of switches. The opening of any one in a first group will serve to actuate one electropneumatic valve operator such as operator 100. Other groups are provided for operating each of the control systems 120–125. For the purpose of illustration, only the individual group of switches for well 31 has been shown in detail.

A series switch system is connected at the upper end thereof to the conductor 130 leading from the alternating current generator 108. The system includes switches 131, 132, 133 and 134 connected in series with a push button switch 135 and a switch 136. The switch 136 is connected to one terminal of a relay coil 111a, the second terminal thereof being connected to ground. The push button switch 135 has connected in parallel therewith a switch 135a and a second switch 135b. In the positions indicated the switches are all set for normal operation with the well 31 *open* for flow through valve 40, the electropneumatic valve operator 100 being shown in the open position. In this state, the opening of any of the switches 131–136 will serve to actuate the valve operator 100 to its closed position.

Switches 131 and 132 are employed for control of all the wells 31–37. The group of controls individually related to well 31 comprises only the switches 133, 134, 135, 135a, 135b, 136 and 111. Switch 131 is connected by a linkage 140 to a control unit 141 and to a transducer 61a on separator 61. Control unit 141 is representative of a microwave link or communication channel, transmitting and receiving communications by way of the antenna 142 and cooperating with a similar unit located on shore. The system 141 is adapted to respond to control signals from shore location to actuate various elements of the producing system. This control equipment was, in one embodiment, of the type manufactured and sold by Westinghouse under the trade name "Visicode Supervisory Control System." The microwave link was in that instance of the type sold by R.C.A., type MM20A (2000 mc. transmitter station).

This system was so designed as to provide for the selection from the shore location of any one of a plurality of stations on the producing platform. The stations are represented in the unit 141 for the successive terminals Nos. 1, 2, 3, etc. In the case of linkage 140 connected to channel 1, the function is to transmit to shore a signal when switch 131 is opened. When the fluid level in the separator 61 exceeds a preset limit, high level sensing unit 61a, by means of the linkage 140, serves to open switch 131 which breaks the current path leading from conductor 130 to the coil 111a. This serves to open switch 111 which is in the excitation circuit for the relay coil 107. When relay coil 107 is deenergized the spring 113 then rotates the valve 102 to apply power gas from channel 101 through channel 104 to the left hand side of the piston in the actuator 100. This serves to close the valve 40, shutting well 31 in. Thus the first function is an operation which closes individual wells in response to the high level control condition in the separator 61.

The opening of switch 131 actuates each of the units 120–125 so that all of the wells will be promptly shut in when the separator liquid level exceeds a preset limit.

The second switch 132 is actuated under the control of a relay in a second control circuit which is substantially independent of the circuit including switches 131 and 132. More particularly, the second circuit includes a series of switches 150, 151, 152 with push button switches 153 and 154 and 155, the latter being connected in series with a parallel circuit consisting of a relay coil 156 and three solenoid valve operators 157, 158 and 159. The upper switch 150 is connected to the positive terminal of a battery 160, the negative terminal of which is connected to ground. The positive terminal of battery 160 is also connected to the output of a rectifier 162 whose input is connected to the conductor 130 leading to generator 108 and thus serves as a source of energy for maintaining battery 160 fully charged. Switch 155 is connected in parallel with a switch 156a which is actuated under the control of relay coil 156. Relay coil 156 is also connected by way of linkage 156b to the switch 132. Under normal conditions the relay coil 156 is energized to maintain switches 156a and 132 in their closed positions. Current flows through switches 150–154 and 156a and thence to the relay coil 156 to ground to complete this circuit. However, if any of the foregoing switches should be open, the coil 156 would be deenergized, thus opening switch 156a and switch 132. The opening of switch 132 would close in all of the wells.

It will be noted that circuit 161 for energizing each of the circuits 120–125 is connected to the juncture between switches 132 and 133 so that actuation of either switch 131 or 132 will serve to close all of the wells 31–37 simultaneously. However, switches 133–136 are singularly related to well 31. A similar set of switches and associated controls will be provided in each of the control units 120–125. Switch 133 is provided on the platform for manual operation, permitting an operator merely to open the switch 133 to close well 31. Switch 134 is actuated under the control of a relay coil 134a which is connected by way of a linkage 134b to terminal No. 8 on the control unit 141. Terminal or station No. 8 is thus a channel for response to an onshore signal which can either energize relay coil 134a to open switch 134 and shut in well 31, or if the well is shut in, the second relay coil 135c may be energized to close switch 135b which will then open the well 31. Push button switch 135 is parallel to switch 135b and is available to an operator on the platform for opening well 31. It should be noted that closure of either switch 135 or 135b only momentarily will permit current to flow through the series of switches and then through the relay coil 111a. The latter coil will close switch 111 to energize relay 107 and at the same time will close switch 135a and will hold the same closed so that only momentary actuation of switch 135 or 135b is required to open well 31.

Finally, the last individual well control circuit involves actuation of switch 136. Switch 136, under normal producing operations, is closed. Switch 136 is connected by way of linkage 136a to a pressure sensitive gauge 136b, illustrated in the form of a Bourdon tube, and is adapted by way of linkage 136a to open switch 136 when the flow line leading to header 46 or 48 is in a low pressure condition, indicating a leak in the flow line.

From the foregoing it will be seen that all of the wells will be shut in in response to a high liquid level condition in the separator 61 or in response to deenergization of relay coil 156. The wells may be individually closed or opened through operation of the control system such as that existing below switch 132. Switch 133 provides local operator control to close the wells. Switch 134 is provided for remote closing of the well. Switches 135 and 135b are available for local and remote opening of the wells, respectively, switch 135a being a holding switch which will be maintained closed following closure of switch 135 or 135b. Switch 136 is a low pressure condition actuated switch which will close the well if a leak should develop in the flow line between the well and the check valve 44.

The overriding control system energized by battery 160 is responsive to the following functions. The switch 150 will be opened in response to energization of relay coil 150a upon receipt of an emergency signal from shore via station No. 17 on unit 141. Switch 151 will be opened in response to a signal from a low pressure sensing unit 61b at the input to the separator 61. Switch 151 is connected by way of linkage 151a to the low pressure sensing unit 61b. Switch 152 is connected by way of linkage 152a to a high pressure sensing unit 61c at the input to the separator 61. Thus if the pressure at the input to the separator is either abnormally low or abnormally high, switch 151 or switch 152 respectively will be opened thereby to deenergize relay coil 156 which opens switch 132 to close in all wells.

Push button switches 153 and 154 are normally closed switches and are available at strategic locations on the platform, permitting an operator to open either switch and shut the wells in. Push button switch 155 is available to an operator on the platform for start up operations. With switches 132 and 156 open, closure of switch 155 will energize relay coil 156, locking switches 132 and 156a closed preparatory to start up operations. Thus the entire platform will be shut in in response to a supervisory control signal from shore by way of station 17 or in response to either a high pressure condition or a low pressure condition at the input to the separator 61. The opening of the circuit leading from battery 160 not only deenergizes relay coil 156 but also denergizes solenoids 157–159 which are connected in parallel with coil 156.

The solenoid coil 157 is connected by way of linkage 157a to an actuator 157b which is designed to open valve 170 when the platform is shut in. Valve 170 leads to a flare 171 so that all high pressure elements of the system may be vented to atmosphere thus substantially reducing any hazards present on the platform. The solenoid coil 158 is connected by way of linkage 158a to a similar actuator 158b. This serves to close the valve 91 on the fuel line 92 and thus immediately extinguishes the heater flame in the still 86. The solenoid coil 159 is connected by way of linkage 159a to an actuator 159b which serves to close a valve (not shown) in the fuel line leading to the line heater 49. Upon the opening of switch 131 or 132 the entire platform is shut in and high pressure elements are vented to the atmosphere so that the presence of an operator on the producing platform is necessary to effect resumption of producing operations.

The foregoing description has dealt with the supervisory control and safety features of the system. In addition to the foregoing there are provided meter and alarm indications which are transmitted to the shore location. The latter elements include the following.

Channel 1 on unit 141 is connected to the link 140 so that there is provided a signal to be transmitted to the shore which indicates the occurrence of a high liquid level condition in separator 61. Channel 2 is connected to a low level condition sensing unit 61d by way of linkage 61e so that there is provided a signal for transmission to shore indicating a low liquid level condition in the separator 61. Channel 3 is connected to a temperature sensing unit 61f by way of linkage 61g so that there is provided a signal for transmission to shore indicative of the temperature of the production at the input to the separator 61. The temperature sensing unit 61f provides an alarm when the temperature at the input to the separator falls below a predetermined minimum.

Channel 4 is connected to a sensing unit 171a associated with the flare valve 170 to provide an alarm signal for transmission to shore when the flare is turned on. This will indicate to an operator that some unusual function is taking place at the platform and will alert him to determine the cause for this operation.

Channel 5 is connected to a control element 76a on the skimmer pump system. The pump motor 78a associated with the skimmer tank is actuated in response to a float in the skimmer tank. When the pump 78 is energized to inject distillate back into the separator, an alarm signal is applied to channel 5 for transmission to shore to indicate the energization of the pump to the operator.

Channels 6 and 7 are connected to glycol feed pumps 87 and 88, respectively, to indicate to an operator which of the pumps is in operation and to provide channels for starting and stopping the glycol pumps.

As previously explained, channel 8 is connected to the relay coil 135c on the control system for the well 31. Channels 9–14 are connected, respectively, to the control systems 120–125 to provide separate controls for each of the wells, 32–37, respectively.

Channel 15 is connected to a control element 53a associated with the adustable choke 53 leading from the low pressure header 48. Channel 15 thus is devised to permit an operator onshore to either open or close the choke 53 by use of unit 53a so that the pressure in the header 48 may be varied and thus control the total production from all of the wells connected to the header 48.

In a similar manner channel 16 is connected to a control unit 51a to control the choke 51 from shore. Opening or closing the choke 51 will increase or decrease the production from wells connected to the high pressure header 46. Thus the relative flow from each of the wells is initially set by use of the chokes such as choke 42 leading from well 31. The wells are then selectively connected to either the high pressure header or to the low pressure header depending upon the flowing pressures of the wells. The range of pressures may be suitably divided at a given operating pressure as may be indicated to those skilled in the art. The total production from the wells after individual production has been set by the chokes is then controlled by the remotely controlled adjustable chokes 51 and 53 by means of onshore operations. It will be understood, however, that the chokes 51 and 53 may be initially set locally on the platform by manual operation.

Channel 17 of unit 141 is connected to the relay coil 150a which in turn is adapted to open switch 150. Channel 17 is thus a supervisory emergency shut down channel to permit an operator on shore to close the platform in when the alarm system above described or otherwise provided through the communication channels indicates that hazardous conditions may exist on the platform.

Channels 18 and 19 are connected, respectively, to pressure gauges on the low pressure header and high pressure header so that the onshore operator may observe header pressure. The channel 20 is connected to a dew point sensing device 180 which is located immediately ahead of the check valve 68 as the total stream, liquid hydrocarbons and gas combined, leaves the platform. High moisture content in this line will indicate that the dehydration unit may be inoperative or operating inefficiently so that water is not being removed from the production. If this condition were allowed to continue, the water in the system might freeze up in critical points, thus causing local hazards and perhaps an explosion of parts unable to withstand pressures that would be impressed if a freeze up occurred.

It is to be noted that each well is provided with a flow meter, such as meter 43 leading from well 31. While meter 43 is shown as a single unit, it is to be understood that this flow meter device provides for recording total stream flow from well 31 and that it also provides a sensing device, a transducer, to generate a signal proportional to flow which is then utilized on channel 21 of the communication system 141. The flow dependent signal is then transmitted to shore and is recorded on shore as well as at the platform location. Similarly, full stream flow measurement systems are provided leading from each of the wells 32–37 with channels 22–27 respectively accommodating the signals for transmission from unit 141 to shore.

Figure 2:
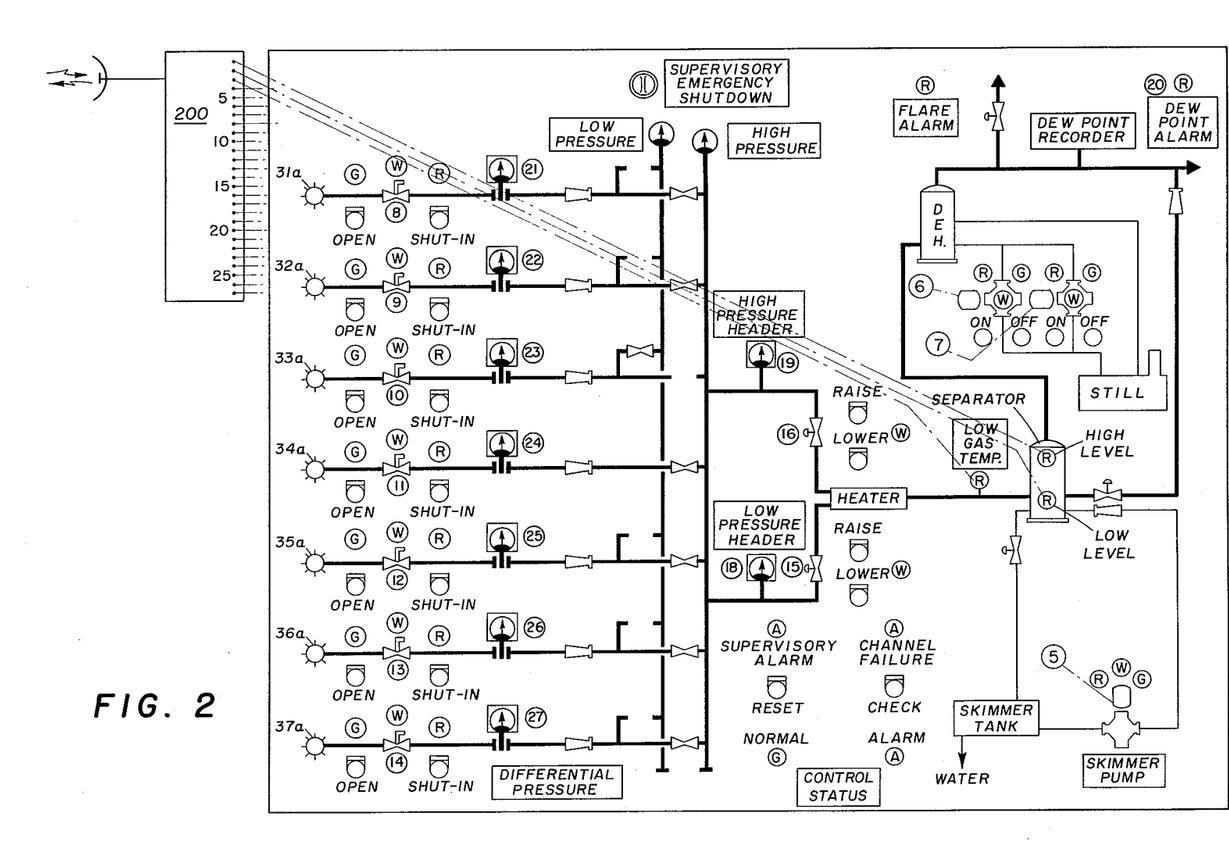
FIG. 2 is a representation of a remote control panel together with a communication network.

Referring now to FIG. 2, there is illustrated a control panel which is located on shore and is responsive to and operable by means of a communication unit 200 which sends and receives signals by means of the antenna 201. The system is responsive to system 141 of FIG. 1. The channels of unit 200 correspond with those of unit 141. Electrical connections lead from the unit 200 to various alarm, control, and indicating devices mounted in and associated with the panel 202. The flow system on the producing platform of FIG. 1 is schematically represented in an outline on the face of the panel 202 with alarms and controls suitably positioned thereon so that an operator may know the status of producing operations on the platform and can exercise supervisory control by actuation of the control elements on the panel. The wells 31–37 of FIG. 1 are represented by the circles 31a–37a of FIG. 2.

Channel 1 on unit 200 is connected to the high level separator alarm. Channel 2 is connected to the low level separator alarm. Channel 3 is connected to the low gas temperature alarm. Channel 4 is connected to the flare alarm. Channel 5 is connected to the skimmer pump and is adapted to be responsive to the switch buttons associated with the skimmer pump so that the pump may be turned on or off in response to supervisory control. Channels 6 and 7 are connected respectively to the two glycol pumps. Signal lights are provided for each pump showing whether the pump is on or off. Start and stop buttons are provided for each pump so that one pump may be started or stopped through actuation of the start or stop button connected to channel 6. The other pump may be started or stopped in response to start or stop buttons by way of channel 7. Channel 8 is adapted to provide control and to indicate the status of the electropneumatic operated controller valve in the line leading from well 31. Channel 9 is adapted to perform the same function with respect to the valve in the line from well 32. Channels 10–14 serve a similar function with respect to the valves in lines leading from wells 33–37, respectively.

Channels 15 and 16 are connected respectively to the low pressure header control system and the high pressure header control system. Actuation of the "raise" button associated with the low pressure header choke will serve to close the choke down and raise the header pressure. Conversely, actuation of the "lower" button will open the choke and reduce the header pressure. Similar functions may be carried out through channel 16 leading to the high pressure header.

Channel 17 is connected to the "supervisory emergency shut down" button. Channels 18 and 19 are connected to the low pressure header gauge and the high pressure header gauge, respectively, to provide an indication onshore of the header pressures. The latter pressures will change in response to opening and closing of the adjustable chokes through channels 15 and 16.

Channel 20 is connected to the dewpoint alarm and to the dewpoint recorder system so that there is provided a continuous record of the water content of the total stream leaving the platform as well as an alarm which will be actuated when the moisture content of the total stream exceeds a predetermined level. Channels 21–27 are connected to the recording gauges located in the flow lines leading from wells 31–37, respectively, so that there is provided onshore a continuous indication of the full stream flow from each well.

While in FIG. 2 some of the connections have been indicated by dashed lines, those that have not been so shown are indicated by terminals at each alarm or control and it is to be understood that such terminals will be connected to corresponding terminals on the unit 200.

Figure 3:
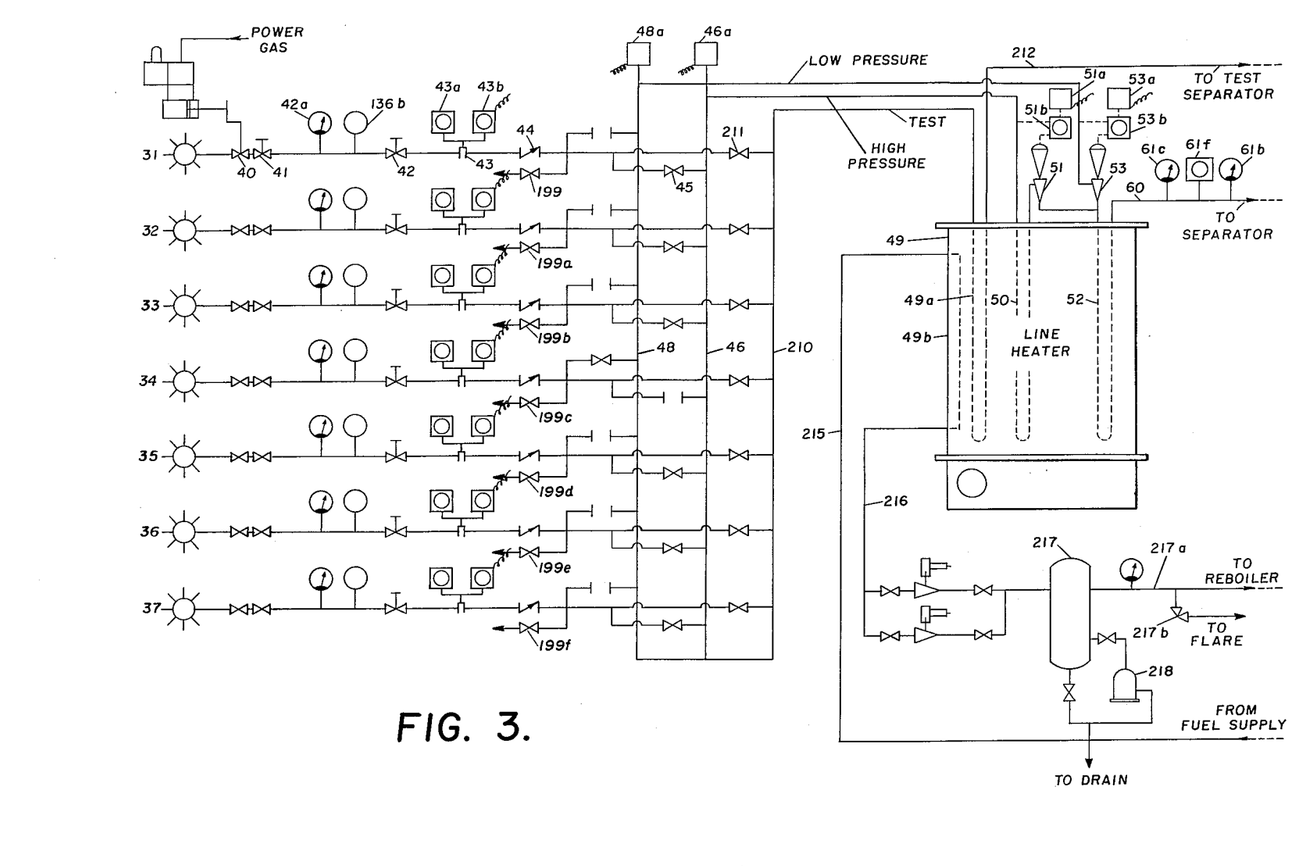
FIGS. 3, 4, and 5 comprise a more detailed flow diagram of a producing and metering system.

Referring now to FIG. 3, the well header system is illustrated in greater detail than in FIG. 1. Where consistent, the same reference characters have been applied to FIG. 3 as to FIG. 1. The wells 31–37 are shown connected through their respective flow lines to the headers 46 and 48. The flow path for well 31, for example, includes the pneumatically controlled valve 40, the manually operable valve 41, a full stream flow measuring element 43 which includes a flow recorder 43a and a flow-signal transducer 43b, which is to be connected to the communications unit 141, FIG. 1. Products then flow through a check valve 44 and, by way of valve 45, to the high pressure header 46. The low pressure sensing unit 136b is positioned in the flow line ahead of the choke 42. Further, an indicating pressure gauge 42a is positioned in the flow line to provide an indication of low pressure in the flow channel. Valve 199 is connected to the flow line from well 31 at a point intermediate the choke 42 and the flow measuring element 43 to vent the flow line to the flare system in the event the latter operation becomes necessary. Six additional valves 199a–199f are provided to vent lines from wells 32–37, respectively.

The high pressure header 46, the low pressure header 48 and a test header 210 are connected to coils in the line heater 49. A pressure gauge unit 46a is connected to the high pressure header. A pressure gauge unit 48a is connected to the low pressure header to provide signals for application to the communications unit 141 of FIG. 1, the latter signals being respectively representative of the header pressures.

In the line heater, products from the high pressure header pass through the first coil system 50, the output of which is connected by way of the adjustable choke 51 to a second coil 52. At the input of the second coil 52 products from the low pressure header 48 are combined, the latter products flowing through the adjustable choke 53. The combined flow from the high and low pressure headers then flows through the second coil 52 of the line heater. When it is desired, production from any given well may be routed through the test header 210 as by the actuation of a vave such as valve 211 leading from well 31. Valve 211 will be opened and valve 45 will be closed so that products from well 31 will flow through the test header 210 to a third coil 49a in the line heater. The commingled products issue from the line heater by way of the flow line 60. The test production issues from a line heater by way of the flow line 212.

It will be noted that the adjustable chokes 51 and 53 are provided with remote loading regulators 51a and 53a, respectively, the latter elements being controlled from the shore station by means of the communication system 141 of FIG. 1. Units 51a and 53a serve to control pneumatic pilots 51b and 53b, respectively. The latter pilots sense the pressure in the high and low pressure headers respectively and serve to adjust the chokes 51 and 53 respectively to a predetermined differential as controlled by the loading regulators 51a and 53a, respectively. FIG. 3 also includes a flow line 215 which leads from a fuel supply line of FIG. 5. Fuel thus derived is passed through a fourth coil 49b in the line heater. The output therefrom issues by way of line 216 and is then applied to a mist extractor 217. Any water entrained in the fuel gas thus treated is eliminated in a water trap 218 and is dumped into the skimmer tank 76 of FIGS. 1 and 5, the latter flow connection not being shown. Fuel gas from the mist extractor 217 then is applied by way of flow line 217a to a treating unit and to pressure reducing devices illustrated in FIG. 5 to supply fuel for the engine 109, FIG. 1, for the line heater 49 of FIGS. 1 and 3, and to provide gas for operating the various instruments throughout the system. A relief valve 217b is connected to the line 217a and is adapted to prevent the existence of pressures in line 217a in excess of that to be accommodated by the gas-operated instruments.

Figure 4:
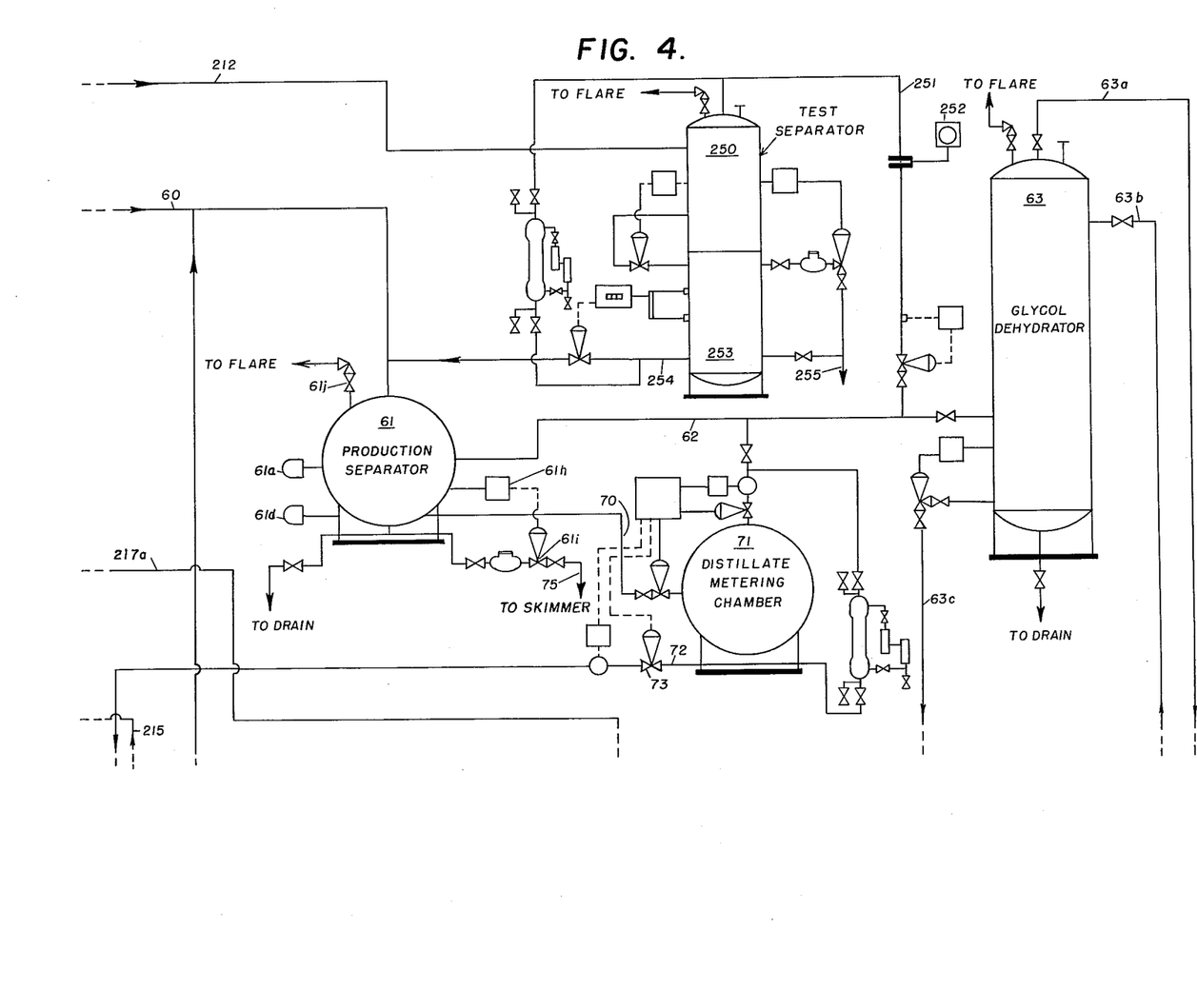

Referring now to FIGS. 3 and 4, the flow line 60 leads to the input of the production separator 61 with the high pressure sensing unit 61c, the low pressure sensing unit 61b and the low temperature sensing unit 61f all being connected to flow line 60 as shown in FIG. 3. Since the producing operation of the present example was principally gas with but little distillate, the production separator was a spherical vessel of relatively small proportions having the high level sensing unit 61a and the low level sensing unit 61d affixed thereto. The production separator 61 also was provided with an output flow line 75 leading to the skimmer tank. In connection therewith a low level sensing unit 61h served to control the water dump valve 61i. The production separator was also provided with a relief valve 61j which would reduce the pressure in the production separator when it exceeded a predetermined maximum limit in the manner known to those skilled in the art. In the system illustrated the production separator and the system downstream of the separator were designed for a working pressure of 1440 pounds per square inch with the valve 61j set at 1340 p.s.i.

Gas from the separator 61 passed by way of line 62 to the dehydration unit, a glycol contactor 63. Dry gas from the contactor 63 then issued by way of flow line 63a leading to the metering run shown in FIG. 5. Distillate separated from the gas and the water in the production separator 61 passed by way of flow line 70 to a distillate metering chamber 71. The metering chamber 71 was provided with automatic controls and counting system. The metering chamber was a dump type meter which would fill to a given volume, then dump the contents thereof, registering on the automatic metering control system the number of such dumping operations so that the total distillate produced could be then metered. The output from the metering chamber passes by way of flow line 72 and an automatically controlled check valve 73 to the point 74 forming a juncture with the output gas from the system. At point 74 the distillate was commingled with the gas for flow through the pipeline 69 to shore.

In passing through the glycol contactor any moisture in the gas is entrained with the lean glycol entering the unit by way of flow line 63b. Enriched glycol passing from the contactor 63 by way of flow line 63c passes to a surge tank 85 having a glycol preheat unit and then through a treating unit 85a to the still 86. Water vapor is removed from the glycol in the still 86 and the lean glycol flowing downward through the glycol reboiler 86a into the preheat unit in tank 85 then flows through the line 85b under the action of glycol pump units 87 or 88. Pumps 87 and 88 later have output lines connected to the line 63b. Two glycol pumps are employed in parallel so that either or both may be employed to assure continued recirculation of lean glycol into the glycol contactor to avoid discharging any moist gas from the contactor.

It will be noted that the flow line 217a leading from the fuel gas mist extractor 217 passes through the glycol reboiler 86a and then to pressure control units to provide fuel gas to the line heaters and to the glycol still and to instrument and power gas. The latter lines have not been shown in detail. However, line 219 extends to the production separator 61. Line 220 extends to the engine 109 (FIG. 1) driving the alternating current generators. Line 221 extends to various pneumatic valve operators and to other gas operated instruments.

All water produced in the system is fed to the distillate skimmer tank 76 via a line 75 extending nearly to the tank bottom. Tank 76 is provided with a distillate over flow chamber 76b shown dotted, the output of which is transferred by way of distillate pump 78 back into the line 60 leading to the production separator input. When water in the distillate skimmer tank 76 reaches the level of line 76e, it flows out through flow line 76c.

Gas produced and flowing through line 63a from the glycol contactor passes through the metering runs which include flow recorders 65 and 66. The gas then passes through a check valve 68 and a pressure control valve 67 and thence to points 74 where it is commingled with distillate in line 69.

Fuel gas from line 63a passes through a metering run which includes the flow recorder 90. Fuel gas then passes by way of line 215 to the line heater and for further treatment as above described. The dewpoint sensing unit and transducer 180 is connected to the line 69 downstream of the commingling point 74.

Referring now to FIG. 6, all production reaching shore by way of line 69 flows into a separator 230, the gas components of which are then transmitted by way of a "gas sales" line 231 and a suitable metering system represented by the meter 232 to a point 233 of custody transfer. The gravity and temperature of the gas are sensed or measured by units 234 and units 235, respectively. Distillate from separator 230 is then applied to a flash vessel 237. Gaseous components are then transmitted by way of line 238 to a flare system. Distillate is then transmitted by way of line 239 to suitable stock tanks 240 and 241. Any waer removed from the system by the separator 230 and the flash vessel 237 then enters the drain system of the onshore treating plant.

It will be seen from the foregoing that the present system provides for full stream flow measurement of the production from each well such as in units 43 leading from well 31. Thereafter all production is commingled for flow through the line heater 49. All distillate thus produced is metered in the metering chamber 71 and all gas produced is metered in the metering runs including devices 65 and 66. However, it is necessary to allocate the distillate produced back to each individual well for accounting purposes. In order to so allocate distillate, it is necessary to establish the individual well production by routing separately each well through the test separator. It should be noted that line 212 leading from the line heater passes to the test separator 250. Gas from the test separator then flows by way of line 251 and is injected into the line 62 leading from the production separator and thus passes to the glycol contactor 63. A meter 252 is provided for measuring the gas component from the individual well connected to the test separator 250. Liquids from the test separator are collected in a metering chamber 253 and are thus measured. Distillate from the test separator flows by way of line 254 into the line 60 leading to the input of the production separator 61. Any water extracted by the test separator flows by way of line 255 into the distillate skimmer tank 76. Each time that any flow line choke, such as choke 42, is changed to alter the flow of production from a given well it is necessary to place the well thus changed on the test separator so that the well production can be properly related to all other wells on the platform. Furthermore it has been found necessary for regulatory purposes to apply the wells to the test separator at least once annually in order to make certain that the allocatioin of the production has been properly set.

The system thus far described is capable of carrying out the metering and producing operations automatically in such a manner as to provide an indication at a remote location of the condition at critical points in the system. The entire system will automatically shut down, closing all of the wells in response to manual control and to flow dependent conditions as follows:

(a) actuation of a supervisory control emergency button at the remote control location;

(b) the occurrence of a low pressure condition at the input to the production separator;

(c) the occurrence of a high pressure condition at the input to the production separator;

(d) the occurrence of a high liquid level condition in the production separator.

Individual wells will be automatically shut in response to:

(a) actuation of a supervisory control button at the remote control station, or (b) the occurrence of a low pressure condition in the flow line leading between a given well and the header system.

The occurrence of any one of the foregoing conditions is deemed to be critical requiring the drastic action of shutting the operations down. While performing these functions, signals are generated indicating conditions which should require the attention of an operator either locally or remotely located. Furthermore, signals are generated adequate to provide all the necessary metering functions. In the event of shut down, the high pressure components of the system are vented to the flare unit as the control system is so designed as to actuate the shut in valves on each of the wells through the use of relatively high pressure power gas with such rapidity that positive shut in is immediately accomplished before any other operations take place. In this regard the pneumatically operated valve controller, such as controller 100, FIG. 1, has been found to be capable of completely shutting in a well having a shut in pressure of the order of 7000 p.s.i. in about two seconds. Such closure serves to promptly eliminate the primary source of danger to the installation. Immediately thereafter the venting of all high pressure components of the system through a suitable flare further reduces hazard and the possibility of fire. It has been found necessary to locate the flare on a second platform spaced a substantial distance from the producing platform in order to permit the disposition of large quantities of gas from relatively high pressure vessels without damage to the producing platform and equipment.

While in the foregoing description the operation has involved the recombining of the distillate and gas after metering thereof, it is to be understood that this expedient of multiphase flow in a common pipeline to shore will be disadvantageous where greater quantities of liquid are produced than in the example employed. The provision of equipment sufficient to provide for separation of the gas and liquid would suggest the separate transmission of the components by way of separate pipelines where the quantities are sufficient to justify the same. In such case the separation and dehydration facilities illustrated in FIG. 6 would not be necessary.

While the system above described has principal application to the control of production from a plurality of wells, it will be recognized that it may also be employed to advantage on a single well where fluids are separated into liquid and gas components in a treating system, separately metered and then delivered from the producing location. In such case a first flow system including a pressure sensing unit in the flow line leading from the well together with a control circuit including an electrical energy source interconnecting the pressure sensing unit and the flow control means provides for control of flow from the well in response to variations in well pressure. A second flow control system is provided with a second circuit having means for generating a plurality of actuating conditions upon sensing deviations of any of a plurality of preselected fluid flow dependent process conditions in the treating system beyond predetermined ranges thereof for closing said well.

Where a plurality of wells are controlled three separate control systems are employed, the first being individually related to each well, the second being adapted to control all wells without interrupting ancillary operations, and the third to control flow from all the wells and to control ancillary operations.

In either of the foregoing cases condition sensing devices at critical points in the system provide for transmission to a remote control location condition dependent signals which may then be utilized to assist in control operations.

Having described the invention in connection with the foregoing, it is understood that further modifications may now suggest themselves to those skilled in the art and it is intended to cover such modifications as fall within the scope of the appended claims.

What is claimed is:

1. In a producing system where hydrocarbons from a plurality of high pressure wells are commingled at a producing location having separating and measuring means wherein the liquid and gas components are separated and separately metered and are then recombined for flow in a common flow line leading from the producing location to a control station remote from said producing location, the combination which comprises a first control means including means separately responsive to a flow dependent condition in each of said wells for individually controlling said wells, and a second control means including means responsive to a predetermined flow dependent condition in said separating and measuring means for actuating said first control means to control all of said wells concurrently.

2. In a producing system where hydrocarbons from a plurality of high pressure wells are commingled at a producing location having separating and measuring means wherein the liquid and gas components are separated and separately metered and are then recombined for flow in a common flow line leading from the producing location to a control station remote from said producing location, the combination which comprises a first control means including means separately responsive to a flow dependent condition in each of said wells for individually controlling said wells, a second control means including means responsive to a predetermined flow dependent condition in said separating and measuring means for actuating said first control means to close all of said wells, a third control means including means responsive to a second flow dependent condition in said separating and measuring means for actuating said first control means to close all of said wells concurrently, a first power supply for said first and second systems fueled by gas from said separating and measuring means, and a second power supply for said third control means energized by said first power supply and including energy storage means.

3. In a producing system where hydrocarbons from a plurality of high pressure wells are commingled at a producing location having separating and measuring means wherein the liquid and gas components are separated and separately metered and are then recombined for flow in a common flow line leading from the producing location to a control station remote from said producing location, the combination which comprises a first control means including means separately responsive to a flow dependent condition in each of said wells for individually closing said wells, a second control means including means responsive to a predetermined flow dependent condition in said separating and measuring means for actuating said first control means to close all of said wells concurrently, a third control means including means responsive to a second flow dependent condition in said separating and measuring means for actuating said first control means to close all of said wells concurrently, an alternating current power source for said first and second control means fueled by gas from said separating and measuring means, a rectifier and battery system comprising a second power supply for said third control means, and connections to apply power to said rectifier from said alternating current power source.

4. In a system for separating entrained liquids from gas produced by a plurality of gas wells and for passing the same through liquid and gas metering units for flow to a control station remote from the location of said wells, the combination which comprises first means for separately sensing the pressure of each well, condition sensing means for sensing deviations from a predetermined flow dependent condition in said system, structure forming a first control means for each of said wells, said structure for each well including said first means and a flow controller on each of said wells for closing any of said wells in response to low pressure therein, and structure forming a second control means including at least a portion of said first control means and said condition sensing means for actuating said first control means to close all of said wells in response to deviations from said flow dependent condition in said system beyond predetermined limits.

5. In a system for separating entrained liquids from gas produced by a plurality of gas wells and for passing the same through liquid and gas metering units for flow to a control station remote from the location of said wells, the combination which comprises first means for separately sensing the pressure of each well, condition sensing means for sensing deviations from a predetermined flow dependent condition in said system, a first circuit for each said well including said first means, a flow controller on each said well coupled to said first circuit and adapted to close said well in response to low pressure, and a second circuit coupling said condition sensing means to all the flow controllers to close all of said wells in response to deviation from said flow dependent condition beyond predetermined limits of said flow dependent condition.

6. In a system for separating entrained liquids from gas produced by a plurality of gas wells and for passing the same through metering units for flow to a control station remote from the location of said wells, the combination which comprises separate gauges for sensing the pressure of each of said wells, a plurality of condition sensing means for sensing deviations of conditions in said system outside a predetermined range, a separate first circuit for each of said wells each having in common an electrical energy source and different ones of the gauges, a flow controller on each said well coupled to its first circuit and adapted to close said well in response to low pressure at its gauge, a second circuit coupling said condition sensing means to all the flow controllers to close all of said wells in response to detection of said conditions outside said range, and a supply circuit extending between said first and second circuits for deriving energy from said first circuit and for storing said energy to power said second circuit.

7. A producing system for a plurality of high pressure wells which comprises a gas operated flow controller at the mouth of each said well, a flow line leading from each said controller to a common header system for commingling the flow from all of said wells, each said flow line including a check valve and a pressure gauge located between said well and said check valve, a liquid-gas separator connected to said header to receive well production therefrom and adapted to operate with liquid level and with pressures therein within predetermined level and pressure ranges respectively, a dehydration unit connected to a gas outlet from said separator for eliminating water from the gas thus produced, metering means for separately gauging the flow of gas and liquid hydrocarbons issuing from said dehydration unit and said separator respectively, flow channels leading from said metering means to a common flow line for commingled gas and liquid hydrocarbons for flow from the producing location, a power gas control system interconnecting each said flow controller and the gas metering means, a first control circuit adapted normally to control application of said power gas to each said flow controller to maintain said wells open, an electrical generator system connected to said first control circuit, a linkage between said first control circuit and the pressure gauge in each well flow line for closing a given one of said wells upon the occurrence of low pressure in the flow line leading therefrom, pressure and liquid level sensing means in said separator and a second control circuit interconnecting said first control circuit and said pressure and liquid level sensing means in said separator for actuating said first control circuit simultaneously to apply said power gas for closure of all of said wells upon the occurrence of pressure or liquid level in said separator outside a predetermined limit of pressure or liquid level.

8. A producing system for a plurality of high pressure wells which comprises a gas operated flow controller at the mouth of each said well, a flow line leading from each said controller to a common header system for commingling the flow from all of said wells, each said flow line including a check valve and a pressure gauge located between said well and said check valve, a liquid-gas separator connected to said header to receive well production therefrom and adapted to operate with liquid level and pressures therein within predetermined level and pressure ranges respectively, a dehydration unit connected to the gas outlet of said separator for eliminating water from the gas thus produced, metering means for separately gauging the flow of gas and liquid hydrocarbons issuing from said dehydration unit and from said separator respectively, flow channels leading from said metering means to a common flow line for commingled gas and liquid hydrocarbons for flow from the producing location, a power gas control system interconnecting each said flow controller and the gas metering means, a first control circuit adapted normally to control application of said power gas to each said flow controller to maintain said wells open, an electrical generator system having connected thereto said first control circuit, a linkage between said first control circuit and the pressure gauge in each well flow line for closing a given one of said wells upon the occurrence of low pressure in the flow line leading therefrom, pressure, liquid level, and temperature sensing means in said separator, a second control circuit interconnecting said first control circuit and said pressure and liquid level sensing means in said separator, said second control circuit being operative independently of said first control circuit and adapted to override the same simultaneously to apply said power gas for closure of all of said wells upon the occurrence of pressures or liquid level in said separator outside a predetermined limit of pressure and liquid level respectively, means for transmitting to a location remote from said producing location indications of said well flow pressures, said temperature and said liquid level, and linkages between said first control circuit, said second control circuit, and said remote location selectively to close any one of said wells or simultaneously to close all of said wells.

9. In a producing system where fluids from a plurality of high pressure wells are commingled at a producing location having separating and measuring means wherein liquid and gas components are separated and separately metered for flow from the producing location to a control station remote therefrom, the combination which comprises at each said well a flow control system including a pressure gauge in the flow line leading from said well, a control circuit coupled to said gauge, and a flow controller actuated by said control circuit for individual control of flow from each said well in response to variations in pressures thereof, a primary electrical energy source common to the control circuits for all said wells, an overriding control system coupled to all of said wells and including a second circuit having means for generating a plurality of actuating conditions dependent upon deviation of a plurality of preselected flow dependent conditions in said separating and measuring means beyond predetermined ranges thereof simultaneously to close all of said wells.

10. In a producing system where fluids from a plurality of high pressure wells are commingled at a producing location having separating and measuring means wherein liquid and gas components are separated and separately metered for flow from the producing location to a control station remote therefrom, the combination which comprises at each said well a flow control system including a pressure gauge in the flow line leading from each well, a control circuit coupled to said gauge and a flow controller actuated by said control circuit for individual control of flow from each said well in response to variations in pressures thereof, a primary electrical energy source common to the control circuits for all said wells, an overriding control system coupled to all of said wells and including a second circuit having means for generating a plurality of actuating conditions dependent upon deviation of a plurality of preselected flow dependent conditions in said separating and measuring means beyond predetermined ranges thereof simultaneously to close all of said wells, a secondary electrical energy source in said second circuit connected to said primary source including means for storing energy from said primary source for assuring failsafe operation of said second circuit, and means in said second circuit responsive to a control condition produced at said control station for actuating said second circuit.

11. In a producing system where fluids from a high pressure well are separated at a producing location into liquid and gas components and separately metered and are then delivered from the producing location, the combination which comprises a first flow control system including a pressure gauge in the flow line leading from said well, a control circuit including an electrical energy source coupled to said gauge and a flow controller in said flow line actuated by said control circuit for control of flow from said well in response to variations in pressure thereof, and an overriding control system coupled to said well and including a second circuit having means for generating a plurality of actuating conditions dependent upon deviations of any of a plurality of preselected flow dependent conditions at said producing location beyond predetermined ranges thereof for closing said well.

12. In a producing system where fluids from a high pressure well are separated at a producing location into liquid and gas components and separately metered and are then delivered from the producing location, the combination which comprises a first flow control system including a pressure gauge in the flow line leading from said well, a control circuit including a primary electrical energy source coupled to said pressure gauge and a flow controller in said flow line actuated by said control circuit for control of flow from said well in response to variations in pressure thereof, an overriding control system coupled to said well and including a second circuit having means for generating a plurality of actuating conditions dependend upon deviations of any of a plurality of preselected flow dependent conditions at said producing location beyond predetermined ranges thereof for closing said well, a secondary electrical energy source interconnecting said primary source and said second circuit for assuring operation of said second circuit upon failure of said primary source, and means in said second circuit responsive to a control condition produced at a location remote from said producing location for actuating said second circuit.

13. In a producing system the combination which comprises a separator for separating fluids from a high pressure well into liquid and gas components for delivery from the producing location, a first flow control system including a pressure gauge in the flow line leading from said well to said separator, a control circuit including a primary electrical energy source coupled to said pressure gauge, and a flow controller in said flow line actuated by said control circuit and powered by said gas components from said separator for control of flow from said well in response to variations in pressure thereof, a fuel supply line having connections leading from said separator for supplying gas to said primary energy source, an overriding control system coupled to said well and including a second circuit having means for generating a plurality of actuating conditions dependent upon deviations of any of a plurality of preselected flow dependent conditions at said producing location beyond predetermined ranges thereof for closing said well, a secondary electrical energy source interconnecting said primary source and said second circuit for operation of said second circuit upon failure of said primary source, and means in said second circuit responsive to a control condition produced at a location remote from said producing location for actuating said second circuit.

14. In a producing system the combination which comprises a separator for separating fluids from a high pressure well into liquid and gas components at a producing location, a gas powered electrical generator having supply connections leading from said separator, a gas powered pneumatically operated flow controller connected to said separator and adapted to utilize energy in said gas selectively to open or close said well, means including a first circuit connected between said generator and said flow controller for directing gas to said flow controller to maintain said well open only when current flows through said circuit from said generator, a first switch interconnected with said first circuit and adapted to be maintained closed in response to pressure from said well in excess of a predetermined maximum and to be opened in response to pressure below a predetermined minimum automatically to close said well upon occurrence of low pressure, switch means in said first circuit adapted selectively to open or to close said first circuit in response to an actuating signal, transmission means coupled to said switch means for transmitting an actuating signal from a location remote from said producing location, a second circuit including electrical storage means and a plurality of control elements, a first linkage between a control element of said second circuit and said first circuit to open said first circuit upon termination of currrent flow from said storage means through said second circuit, a plurality of circuit breakers in said second circuit individually responsive to any one of a first set of flow dependent conditions at said producing location including said separator for opening said second circuit, means responsive to an actuating signal from said remote location for opening said second circuit, means linking said separator and said first circuit responsive to a flow dependent condition other than of said first set for independently opening said first circuit, and an energy transfer coupling between said generator and said storage means.

15. In a producing system the combination which comprises a separator for separating fluids from a high pressure well into liquid and gas components at a producing location, a gas powered electrical generator having supply connections leading from said separator, a gas powered pneumatically operated flow controller connected to said separator and adapted to utilize energy in said gas selectively to open or close said well, means including a first circuit connected between said generator and said flow controller for directing power gas to said flow controller to maintain said well open only when current flows through said first circuit from said generator, a first switch adapted to be maintained closed in response to pressure from said well in excess of a predetermined maximum and to be opened in response to pressure below a predetermined minimum automatically to close said well upon occurrence of low pressure, switch means in said first circuit adapted selectively to open or to close said first circuit in response to an actuating signal, transmission means coupled to said switch means for transmitting an actuating signal from a location remote from said producing location, a second circuit including a battery and a plurality of control elements energized by current flow from said battery, a first linkage between a control element of said second circuit and said first circuit to open and close said first circuit upon termination and initiation, respectively, of current flow in said second circuit, series connected switches in said second circuit each responsive to one of a set of selected flow dependent conditions at said producing location for opening said second circuit when any such flow dependent condition is outside a preselected range, a further series connected switch in said second circuit adapted to be opened in response to an actuating signal from said remote location, means linking said separator and said first circuit responsive to a flow dependent condition not included in said set for independently opening said first circuit, and a battery charging circuit leading from said generator to said battery for control of said well through said second circuit.

16. The method of producing gas and entrained liquids from a high pressure well which comprises sensing the total flow and the flowing pressure of said well, in a treating system separating the flow from said well into hydrocarbon liquids and gas, separately metering the quantities of said gas and said hydrocarbon liquids, maintaining said well open under the control of pressure from said gas for flow from said well, in response to flowing pressure from said well below a predetermined minimum controlling flow with energy developed by pressure of said gas, closing said well under control of said gas in response to the occurrence in said system of any one of high liquid level or pressure in excess of a predetermined maximum or less than a predetermined minimum, and following the closure of said well venting said system to reduce the pressure therein to atmospheric pressure.

17. The method of producing gas and entrained liquids from a plurality of high pressure wells, the heads of which are at a common producing location, which comprises separately sensing the total flow from each of said wells and the flowing pressures thereof, commingling the flow from all of said wells, in a treating system separating the commingled flow into gas, hydrocarbon liquids, and water, separately metering the quantities of said gas and hydrocarbon liquids, maintaining said wells open under the control of pressure from said gas for flow from said wells, in response to flowing pressure from any of said wells below a predetermined minimum controlling the flow from such well with energy developed by pressure of said gas, closing all said wells through use of said energy in response to the occurrence in said system of any one of high liquid level or pressure in excess of a predetermined maximum or less than a predetermined minimum, and venting said system to atmosphere following closure of said wells.

18. The method of producing gas and entrained liquids from a plurality of high pressure wells the heads of which are at a common producing location which comprises separately sensing the total flow from each of said wells and the flowing pressure of each of said wells, commingling the flow from all of said wells, in a treating system separating the commingled flow into gas, hydrocarbon liquids and water entrained in said gas, separately sensing the quantities of gas and hydrocarbon liquids, commingling the hydrocarbon liquids and gas for flow to a central treating station, maintaining said wells open under the control of pressure from said gas for flow from all of said wells, in response to flowing pressure from any well below a predetermined minimum closing such low pressure well with energy developed by pressure of said gas, closing all of said wells under control of pressure from said gas in response to the occurrence in said system of either high liquid level or pressure in excess of a predetermined maximum or less than a predetermined minimum, transmitting to said central treating station signals representative of said flowing pressures and flow rates, and selectively transmitting to said producing location actuating signals to close all or any one of said wells and to open any one of said wells.

19. In a producing system where hydrocarbons from a plurality of high pressure wells are commingled at a producing location having separating and measuring means wherein the liquid and gas components are separated and separately metered and are then recombined for flow in a common flow line leading from the producing location to a control station remote from said producing location, the combination which comprises a first system including means interconnected with each well and separately responsive to a predetermined flow dependent condition in each of said wells for individually controlling said wells, a second system including means responsive to a predetermined flow dependent condition in said separating and measuring means and interconnected with said first system for actuating said first system to control all of said wells concurrently, and a third system including means responsive to a different predetermined flow dependent condition in said separating and measuring means and interconnected with said first system for actuating said first system to control all of said wells concurrently.

20. A producing system for a plurality of high pressure wells which comprises a power gas operated flow controller connected to each said well, a flow line leading from each said controller to a common header system for commingling the flow from all of said wells, each said flow line including a check valve and a pressure gauge located between said well and said check valve, a liquid-gas separator interconnected with said flow lines and adapted to operate with liquid level and with pressures therein within predetermined liquid level and pressure ranges respectively, separate outlet lines leading from said separator for gas and liquid hydrocarbons issuing therefrom, a dehydration unit connected to the gas outlet line for eliminating water from the gas thus produced, metering means interconnected with said dehydration unit and with the liquid hydrocarbon outlet line respectively for separately gauging the flow of gas and liquid hydrocarbons issuing from said dehydration unit and from said separator, flow channels leading from said metering means to a common flow line for commingled gas and liquid hydrocarbons for flow from the producing location, a power gas control means interconnected with each said flow controller for controlling the application of power gas to each said flow controller to open or close said wells, a first control circuit including an electrical generator coupled to said power gas control means, said first control circuit adapted normally to cause said power gas control means to apply power gas to each said flow controller to maintain said wells open, a linkage between said first control circuit and the pressure gauge in each well flow line for actuating said first control circuit to cause said power gas control means to apply power gas to a given one of said flow controllers to close the well connected therewith upon the occurrence of low pressure in the flow line leading therefrom, pressure and liquid level sensing means in said separator, and a second control circuit connected to said pressure and liquid level sensing means and to said first control circuit and operative independently thereof for actuating said first control circuit to cause said power gas control means simultaneously to apply power gas to all said flow controllers for closure of all of said wells upon the occurrence of pressure or liquid level in said separator outside said pressure and liquid level ranges respectively.

21. In a producing system where fluids from a plurality of high pressure wells are commingled at a producing location having separating and measuring means wherein liquid and gas components are separated and separately metered for flow from the producing location to a control station remote therefrom, the combination which comprises a flow control system for each said well including a pressure sensing element in a flow line leading from each said well, a flow control means for each said well for controlling flow from said wells, a control circuit having a primary electrical energy source and interconnecting the pressure sensing elements and the flow control means of each said well for separately actuating each said flow control means to control flow from each said well in response to variations in well pressures, a second control system coupled to all of said wells, said second control system including means for sensing a plurality of preselected flow dependent conditions in said producing system and a second circuit interconnecting said last-named means and said control circuit for causing said control circuit to actuate simultaneously all of said flow control means to control flow from said wells in response to deviation of said preselected flow dependent conditions beyond predetermined ranges thereof.

References Cited by the Examiner

UNITED STATES PATENTS

| | | | |
|---|---|---|---|
| 2,081,542 | 5/1937 | Kidney | 251—32 X |
| 2,328,001 | 8/1943 | Furse et al. | 166—4 |
| 2,736,201 | 2/1956 | Ohlsen et al. | |
| 2,845,125 | 7/1958 | Truman | 166—52 |
| 2,911,953 | 11/1959 | Killian | 251—31 X |
| 2,949,273 | 8/1960 | Roper et al. | 251—30 X |

CHARLES E. O'CONNELL, *Primary Examiner.*

BENJAMIN BENDETT, *Examiner.*